United States Patent
Tai

(10) Patent No.: US 10,039,000 B2
(45) Date of Patent: Jul. 31, 2018

(54) HOST-SLAVE CONTROL SYSTEM AND ADDRESSING METHOD THEREOF

(71) Applicant: FSP TECHNOLOGY INC., Taoyuan (TW)

(72) Inventor: Chih-Hung Tai, Taoyuan (TW)

(73) Assignee: FSP TECHNOLOGY INC., Taoyuan (TW)

( * ) Notice: Subject to any disclaimer, the term of this patent is extended or adjusted under 35 U.S.C. 154(b) by 331 days.

(21) Appl. No.: 14/681,102

(22) Filed: Apr. 8, 2015

(65) Prior Publication Data

US 2015/0312210 A1 Oct. 29, 2015

(30) Foreign Application Priority Data

Apr. 24, 2014 (TW) .............................. 103114833 A

(51) Int. Cl.
| | |
|---|---|
| *G06F 15/16* | (2006.01) |
| *H04W 8/26* | (2009.01) |
| *H04L 29/12* | (2006.01) |
| *H04L 12/403* | (2006.01) |

(52) U.S. Cl.
CPC ............ *H04W 8/26* (2013.01); *H04L 12/403* (2013.01); *H04L 61/2038* (2013.01)

(58) Field of Classification Search
None
See application file for complete search history.

(56) References Cited

U.S. PATENT DOCUMENTS

| | | | | |
|---|---|---|---|---|
| 7,889,051 | B1* | 2/2011 | Billig | H04L 12/2818 340/286.01 |
| 2006/0109203 | A1* | 5/2006 | Huber | H05B 37/0254 345/39 |
| 2008/0036401 | A1* | 2/2008 | Erhardt | H05B 37/0245 315/349 |
| 2011/0043124 | A1* | 2/2011 | Johnston | H05B 37/0263 315/250 |
| 2011/0130851 | A1* | 6/2011 | Ferstl | H05B 37/0254 700/90 |
| 2012/0299509 | A1* | 11/2012 | Lee | H04L 41/0806 315/291 |

\* cited by examiner

*Primary Examiner* — Younes Naji
(74) *Attorney, Agent, or Firm* — JCIPRNET

(57) ABSTRACT

A host-slave control system and an addressing method thereof are provided. The host-slave control system includes a plurality of slave devices, a host device, and a remote control device. The host device is coupled to and controls the slave devices through a host-slave transmission interface. When one of the slave devices receives an addressing signal sent by the remote control device, the one of the slave devices sends an addressing information to the host device, such that the host device assigns a specific address as the address of the one of the slave devices according to the addressing information. In particular, the addressing information includes a default identification code of the one of the slave devices, and the address assigned to the one of the slave devices corresponds to the default identification code of the one of the slave devices.

16 Claims, 5 Drawing Sheets

US 10,039,000 B2

HOST-SLAVE CONTROL SYSTEM AND ADDRESSING METHOD THEREOF

CROSS-REFERENCE TO RELATED APPLICATION

This application claims the priority benefit of Taiwan application serial no. 103114833, filed on Apr. 24, 2014. The entirety of the above-mentioned patent application is hereby incorporated by reference herein and made a part of this specification.

BACKGROUND OF THE INVENTION

Field of the Invention

The invention relates to a host-slave control system and an addressing method thereof, and more particularly, to a host-slave control system capable of remote control addressing and an addressing method thereof.

Description of Related Art

To achieve more precise and smarter control behavior, a host-slave system architecture is often widely applied in current control system applications. Using a digital addressable lighting interface (hereinafter DALI) as an example, DALI is a light control interface standard for illumination control. The current DALI system is mainly used to integrate lamp control inside buildings to achieve the requirements for smart light control.

Specifically, the DALI system generally send a command to a plurality of slave devices connected to lamps by a host device, such that when the slave devices receive the command, the slave devices respond appropriately and accordingly control the brightness of the corresponding lamps. In the current DALI system, the host device generally utilizes a two-wire transmission interface to communicate with slave devices. Therefore, the host device needs to define an address corresponding to each of the slave devices (generally referred to as "addressing") before the host device performs control on each of the slave devices, such that the host device can individually perform control on each of the slave devices via the corresponding addresses, and further control the lamps connected to the slave devices.

When a DALI system is built, the addressing action needs to input the default identification code of each of the slave devices to the host device one by one through engineering staff, and then the host device respectively assigns different addresses to the corresponding slave devices and sets an absolute position corresponding to each of the slave devices. Then, engineering staff still need to respectively install the slave devices to default construction positions after addressing is complete. However, in the traditional addressing method, in case there is a large number of the slave devices, engineering staff often confuse the absolute positions set on the host device with the actual construction positions of different slave devices when installing the slave devices on the construction positions. For instance, slave devices which should be installed in room A may be installed in room B due to construction negligence, such that the lit status of the lamp in room A shown on the host device is incorrect (in actuality, the lamp in room B is lit). As a result, the efficiency of the overall installation and the efficiency of the building of a DALI system are low.

SUMMARY OF THE INVENTION

Accordingly, to solve the issues of the prior art, the invention provides a host-slave control system and an addressing method thereof capable of operating slave devices and a host device by a remote control device, such that the host device can remotely address the slave devices.

A host-slave control system of the invention includes a plurality of slave devices, a host device, and a first remote control device. In particular, each of the slave devices has a corresponding default identification code. The host device is coupled to and controls the slave devices through a host-slave transmission interface. The first remote control device is configured to emit a first addressing signal. In particular, when one of the slave devices receives the first addressing signal, the one of the slave devices sends a first addressing information to the host device, such that the host device assigns a first address as the address of the one of the slave devices according to the first addressing information. In particular, the first addressing information includes a first default identification code of the one of the slave devices. In particular, the first address assigned to the one of the slave devices corresponds to the identification code.

In an embodiment of the invention, the first remote control device further returns a remote control setting information to the host device, and assigns the first address as the address of the one of the slave devices when the host device receives the first addressing information and the remote control setting information within a period.

In an embodiment of the invention, the first addressing information sent by the one of the slave devices in response to the first addressing signal further includes a first device engineering code.

In an embodiment of the invention, the remote control setting information includes a remote control engineering code, the host device compares the first device engineering code with the remote control engineering code when the host device receives the first addressing information and the remote control setting information, and assigns the first address as the address of the one of the slave devices when the remote control engineering code is determined to be matched with the first device engineering code.

In an embodiment of the invention, the host device further receives an absolute position information, and assigns the absolute position information to correspond to the first address when the host device determines that the remote control engineering code is matched with the first device engineering code.

In an embodiment of the invention, the absolute position information is inputted from the first remote control device, and is contained in the remote control setting information to be sent to the host device.

In an embodiment of the invention, the absolute position information is inputted from the host device.

In an embodiment of the invention, when the host device receives the first addressing information, the host device controls the one of the slave devices to send a position indication message.

In an embodiment of the invention, the host-slave control system further includes a second remote control device configured to emit a second addressing signal. In particular, when another one of the slave devices receives the second addressing signal, the another one of the slave devices sends a second addressing information to the host device, such that the host device assigns a second address as the address of the another one of the slave devices according to the second addressing information. In particular, the second addressing information includes a second default identification code of the another one of the slave devices. In particular, the second address assigned to the another one of the slave devices corresponds to the second default identification code.

In an embodiment of the invention, the first addressing signal includes a first device engineering code and the second addressing signal includes a second device engineering code, and the first and second device engineering codes are different from each other.

In an embodiment of the invention, the host-slave control system further includes a status sensing module, the status sensing module is coupled to the host device for sensing an environmental status information, wherein the host device adjusts an operational status of at least one of the slave devices according to the environmental status information.

In an embodiment of the invention, each of the slave devices includes at least one load device and a slave control unit, and the slave control unit is coupled to the load device and controlled by the host device to control an operation of the load device.

In an embodiment of the invention, the host-slave transmission interface is a digital addressable lighting interface.

The invention further provides an addressing method of a host-slave control system, wherein the host-slave control system includes a host device and a plurality of slave devices, and the addressing method of a host-slave control system includes: sending an addressing information to the host device by one of the slave devices when the one of the slave devices receives an addressing signal, wherein the addressing information includes a default identification code of the one of the slave devices; and assigning a first address as the address of the one of the slave devices according to the addressing information when the host device receives the addressing information. In particular, the first address assigned to the one of the slave devices corresponds to the default identification code of the one of the slave devices.

In an addressing method of a host-slave control system of an embodiment of the invention, the addressing information sent by the one of the slave devices in response to the addressing signal further includes a device engineering code.

In an embodiment of the invention, the step of assigning the first address as the address corresponding to the one of the slave devices according to the addressing information includes: receiving a remote control setting information by the host device, wherein the remote control setting information includes a remote control engineering code; comparing the device engineering code with the remote control engineering code by the host device; determining whether the remote control engineering code is matched with the device engineering code; and assigning the first address as the address of the one of the slave devices by the host device when the remote control engineering code is determined to be in compliance with the device engineering code.

In an embodiment of the invention, the addressing method of a host-slave control system further includes: receiving an absolute position information by a host device; and assigning the absolute position information to correspond to the first address by the host device when the remote control engineering code is determined to be matched with the device engineering code.

In an embodiment of the invention, the addressing method of a host-slave control system further includes: controlling the one of the slave devices to send a position indication message when the host device receives the addressing information.

In an embodiment of the invention, the addressing method of a host-slave control system further includes: sensing an environmental status information; and adjusting the operational status of at least one of the slave devices according to the environmental status information.

Moreover, the invention provides an addressing method of a host-slave control system, wherein the host-slave control system includes a host device, a plurality of slave devices, and a remote control device, the addressing method including: emitting an addressing signal by the remote control device; sending an addressing information to the host device by one of the slave devices when the one of the slave devices receives the addressing signal, wherein the addressing information includes a device engineering code and a default identification code of the one of the slave devices; returning a remote control engineering code to the host device by the remote control device; comparing the device engineering code with the remote control engineering code by the host device; and assigning a first address as the address of the one of the slave devices by the host device when the host device determines that the remote control engineering code is matched with the device engineering code, wherein the first address assigned to the one of the slave devices corresponds to the default identification code of the one of the slave devices.

Based on the above, the embodiments of the invention provide a host-slave control system and an addressing method thereof. The addressing method can be performed via a method of remote control, and therefore engineering staff can first finish the installation of all the slave devices and then perform addressing and the setting of absolute position on each of the slave devices. As a result, the risk of negligence by engineering staff during construction can be reduced, and the efficiency of system building can be effectively increased. Moreover, the host-slave control system can collect environmental information by the status sensing module and provide the environmental information to the host device as reference for control. Therefore, the host-slave control system of the present embodiment can also achieve dynamic adjustment of, for instance, light brightness, air conditioning intensity, and the magnitude of the opening and closing of curtains according to change in environmental status. As a result, the design of smart buildings is achieved.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
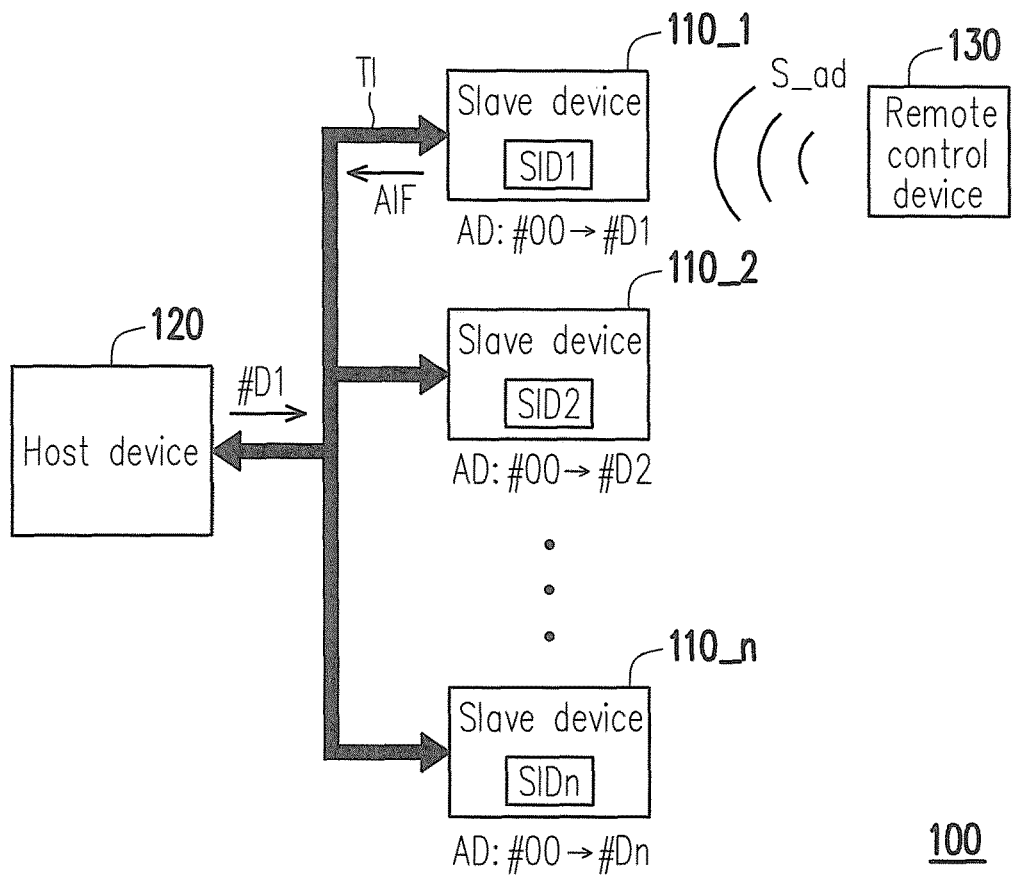
FIG. 1 is a function block schematic of a host-slave control system according to an embodiment of the invention.

To make the contents of the disclosure more easily understood, embodiments are provided below as examples of the plausibility of implementation of the disclosure. Moreover, when applicable, devices/components/steps having the same reference numerals in figures and embodiments represent the same or similar parts.

FIG. 1 is a function block schematic of a function of a host-slave control system of according to an embodiment of the invention. Referring to FIG. 1, a host-slave control system 100 includes a plurality of slave devices 110_1 to 110_n, a host device 120, and a remote control device 130, wherein n is a positive integer selected according to design requirements. For instance, the slave devices 110_1 to 110_n and the host device 120 of the present embodiment can form a digital addressable lighting interface (DALI) system. In an exemplary embodiment of the DALI system, since the host device 120 can control at most 64 slave devices 110_1 to 110_n, the n value can be set to be less than or equal to the positive integer of 64.

In the present embodiment, the slave devices 110_1 to 110_n can communicate with the host device 120 through a host-slave transmission interface (e.g., bus) TI, and control the operation of the corresponding load devices (not shown, further described in later embodiments) according to a command sent by the host device 120. In particular, the slave devices 110_1 to 110_n can be implemented using a circuit board, and respectively have corresponding default identification codes SID1 to SIDn. The host-slave transmission interface TI can be, for instance, DALI, and can achieve signal transmission and power supply through a two-wire transmission line and supply line, but the invention is not limited thereto.

The host device 120 can be used to send a corresponding command to one or a plurality of the slave devices 110_1 to 110_n according to the control and/or specific control conditions of the user to achieve a smart load control function. For instance, the host device 120 can be controlled to send a brightness setting command for adjusting the brightness of lamp, send an action command for opening or closing of curtains, or send a environmental control command for adjusting the temperature of an air conditioner, such that the slave devices 110_1 to 110_n control the load devices according to the received command. In the present embodiment, the host device can be, for instance, an electronic device having logic operation capability and a control interface such as a personal computer, but the invention is not limited thereto.

The remote control device 130 can emit a signal via a wireless method. When the slave devices 110_1 to 110_n receive the signal emitted by the remote control device 130, the slave devices 110_1 to 110_n can respond to the received signal to directly control the operation of the load devices, or return a corresponding command request or information to the host device 120, such that the host device 120 sends a corresponding command to control the operation of the slave devices 110_1 to 110_n. In other words, the user can remotely control (i.e., without directly operating the host device 120) the operation of the slave devices 110_1 to 110_n by the remote control device 130. For instance, the user can emit a dimming or addressing signal to a specific slave device 110_1 to 110_n by the remote control device 130, and the slave device 110_1 to 110_n receiving the dimming or addressing signal (such as S_ad) can perform a corresponding control behavior according to the received signal. In the present embodiment, the remote control device 130 can be, for instance, any electronic device capable of performing wireless communication such as a smart phone, a tablet computer, or an infrared remote controller. The type of the wireless communication can be, for instance, infrared, bluetooth, or WiFi, but the invention is not limited thereto.

Figure 2:
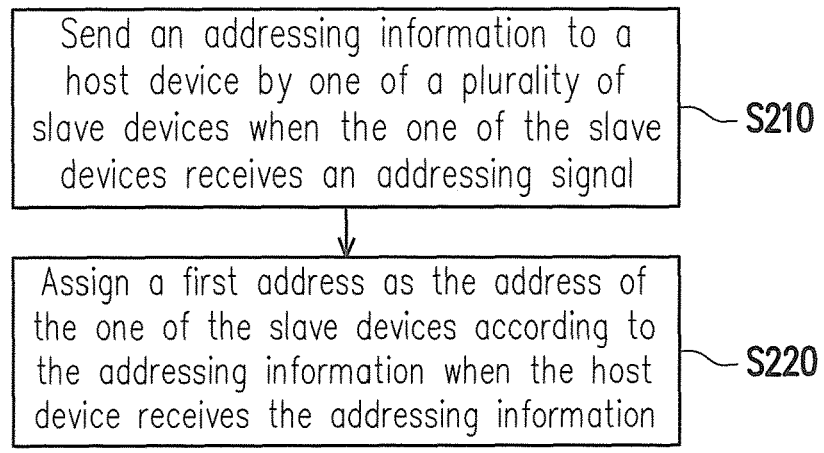
FIG. 2 is a steps flowchart of an addressing method of a host-slave control system according to an embodiment of the invention.

The processing steps of the addressing method of the embodiment of FIG. 2 are described with reference to the architecture of FIG. 1. In the present embodiment, the slave devices 110_1 to 110_n and the host device 120 are used as the subjects of action of the addressing method. Referring to both FIG. 1 and FIG. 2, when one of the slave devices 110_1 to 110_n receives the addressing signal S_ad (the addressing signal S_ad can be emitted by, for instance, the remote control device 130, but is not limited thereto), the one of the slave devices 110_1 to 110_n sends an addressing information AIF to the host device 120, wherein the addressing information AIF includes the default identification code SID1 to SIDn of the one of the slave devices 110_1 (step S210). Then, when the host device 120 receives the addressing information AIF, the host device 120 assigns a first address (such as "#D1") as an address AD of the one of the slave devices 110_1 to 110_n according to the addressing information AIF (step S220). From the viewpoint of the host device 120, the action in which the first address is assigned as the address of the one of the slave devices 110_1 to 110_n is linking of the first address and the default identification code of the one of the slave devices 110_1 to 110_n. In other words, the first address assigned to the one of the slave devices 110_1 to 110_n corresponds to the default identification code of the one of the slave devices 110_1 to 110_n.

It should be mentioned that, from another viewpoint, if the slave devices 110_1 to 110_n, the host device 120, and the remote control device 130 are used as the subjects of action of the addressing method, before step S210, the remote control device 130 first performs a step of emitting the addressing signal S_ad. In other words, those having ordinary skill in the art should understand that, an addressing method in which the slave devices 110_1 to 110_n can return the corresponding addressing information AIF to the host device 120 by receiving a specific addressing signal (regardless of whether the addressing signal is emitted by the remote control device 130) such that the host device 120 can accordingly perform addressing on the slave devices 110_1 to 110_n is within the scope of the invention.

Specifically, addressing is performed on the slave device 110_1 as an example. When addressing is not yet performed, a default address AD of each of the slave devices 110_1 to 110_n is, for instance, "#00." Engineering staff can first send the addressing signal S_ad to the slave device 110_1 using the remote control device 130. When the slave device 110_1 receives the addressing signal S_ad, the slave device 110_1 returns the addressing information AIF containing the default identification code SID1 thereof to the host device 120. Then, when the host device 120 receives the addressing information AIF sent by the slave device 110_1, the host device 120 assigns one address "#D1" to the slave device 110_1. Therefore, at this point, the address AD of the slave device 110_1 is changed from the default "#00" to "#D1." The addressing action of the slave device 110_1 is thus complete. Moreover, when addressing is performed, engineering staff can further perforin setting the absolute position corresponding to the slave device 110_1 at the same time. After the host device 120 completes the addressing action of the slave device 110_1, engineering staff can input the absolute position information of the slave device 110_1 to the host device 120 through the control interface of the host device 120 or the remote control device 130 (further described in later embodiments).

By executing the aforementioned addressing method, engineering staff can perform addressing on the other slave devices 110_2 to 110_*n* one by one, such that the address AD of each of the slave devices 110_2 to 110_*n* is changed from the default "#00" to different numerical values (such as #D2, . . . , #Dn). Therefore, if the host device 120 sends a command containing the address "#D1," only the slave device 110_1 responds to the command and other slave devices 110_2 to 110_*n* do not respond to the command after addressing of the slave devices 110_1 to 110_*n* is complete.

Via the above addressing method, the addressing action of the slave devices 110_1 to 110_*n* can be performed via a method of remote control, so that engineering staff do not need to first perform addressing next to the host device 120 before installing the slave devices 110_1 to 110_*n* to default construction positions. More specifically, in the addressing method of an embodiment of the invention, engineering staff can first install all of the slave devices 110_1 to 110_*n* to the default construction positions, and then perform addressing and setting of absolute position on each of the slave devices 110_1 to 110_*n* in order. In comparison to the traditional addressing method, the addressing method of an embodiment of the invention can significantly reduce the risk of confusing the absolute positions of different slave devices 110_1 to 110_*n* set on the host device 120 with the actual construction positions by engineering staff.

Figure 3:
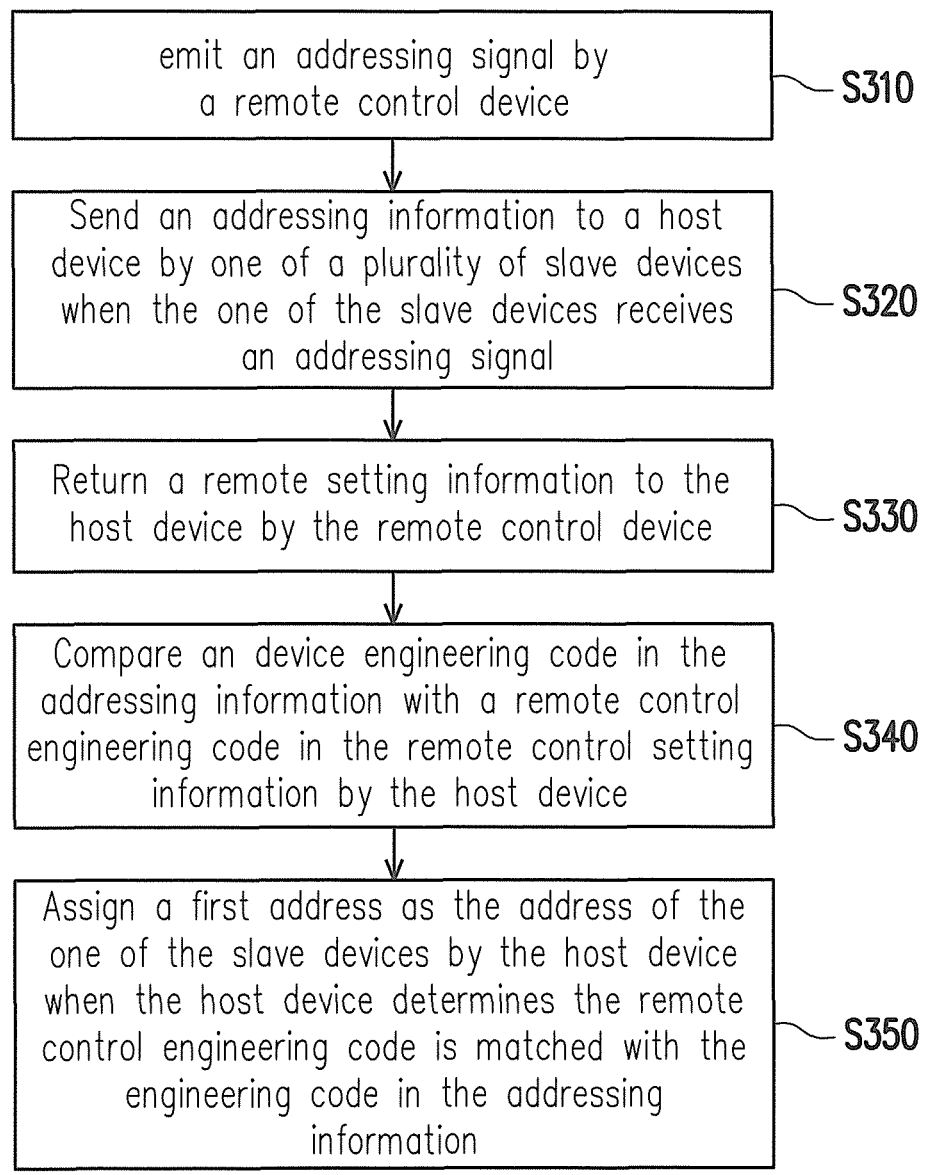
FIG. 3 is a steps flowchart of an addressing method of a host-slave control system according to another embodiment of the invention.
Figure 4:
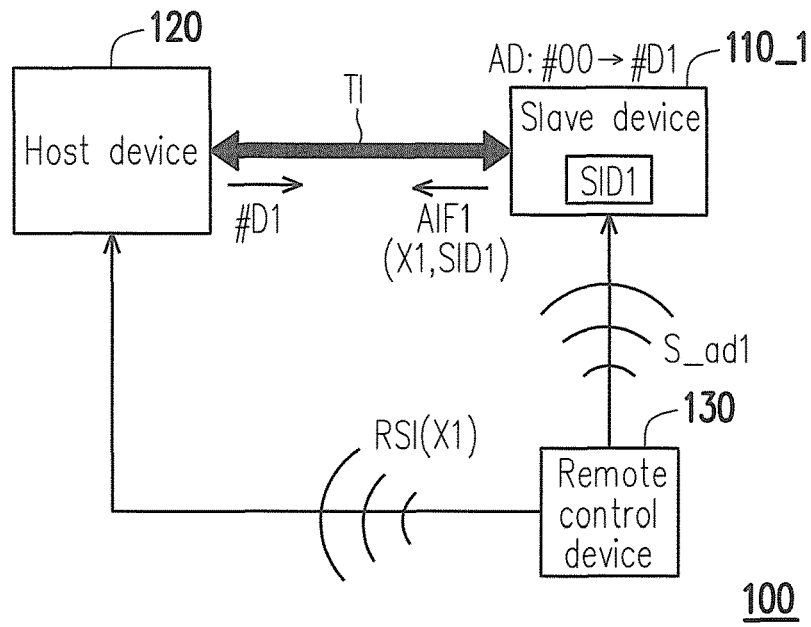
FIG. 4 is a schematic of a host-slave control system according to an embodiment of the invention performing an addressing action.

In the following, the specific processing steps of the addressing method of a host-slave control system are further described with reference to FIG. 3 and FIG. 4. In particular, FIG. 3 is a steps flowchart of an addressing method of a host-slave control system according to another embodiment of the invention, and FIG. 4 is a schematic of a host-slave control system according to an embodiment of the invention performing an addressing action. In the present embodiment, addressing is performed on the slave device 110_1 as an example, but the invention is not limited thereto.

Referring to both FIG. 3 and FIG. 4, when addressing is performed on the slave device 110_1, engineering staff can emit the addressing signal S_ad toward the slave device 110_1 using the remote control device 130 (step S310). When the slave device 110_1 receives the addressing signal S_ad, the slave device 110_1 sends an addressing information AIF1 to the host device 120 (step S320). In particular, the addressing information AIF1 includes a device engineering code and the default identification code SID1 of the slave device 110_1, the device engineering code sent by the slave device 110_1 is, for instance, X1, and therefore the addressing information AIF1 is represented by AIF1 (X1, SID1).

Moreover, the remote control device 130 returns a remote control setting information RSI to the host device 120 through a network or other transmission means (wired or wireless) (step S330). In particular, the remote control setting information RSI includes a remote control engineering code corresponding to the remote control device 130, the remote control engineering code emitted by the remote control device 130 is, for instance, X1, and therefore the remote control setting information is represented by RSI (X1).

When the host device 120 receives the remote control setting information RSI (X1), the host device 120 compares the device engineering code X1 of the addressing information AIF1 with the remote control engineering code X1 of the remote control setting information RSI (X1) (step S340). Then, when the host device 120 determines the remote control engineering code is matched with the device engineering code returned by the slave device 110_1 (that is, both are X1), the host device 120 assigns the address "#D1" as the address AD of the slave device 110_1 (step S350). In other words, in addition to emitting the addressing signal AIF1 to the host device 110_1, the remote control device 130 of the present embodiment also returns the remote control setting information RSI to the host device 120, such that when the host device 120 receives the addressing signal AIF1 and the remote control setting information RSI within a period, the host device 120 assigns the address "#D1" as the address AD of the slave device 110_1.

In the present embodiment, if the device engineering code and the remote control engineering code received by the host device 120 are emitted by the same remote control device 130, then the host device 120 determines the remote control engineering code is matched with the device engineering code; on the other hand, if the device engineering code and the remote control engineering code received by the host device 120 are not emitted by the same remote control device 130, then the host device 120 determines the remote control engineering code is not matched with the device engineering code, and therefore does not assign the address "#D 1" to the slave device 110_1, i.e., does not perform an addressing action on the slave device 110_1. Via the method of comparing the remote control engineering code with the device engineering code, the host-slave control system of an embodiment of the invention can further achieve the function of performing addressing on different slave devices at the same time using a plurality of remote control devices (further described in the embodiment of FIG. 6 later).

Figure 5:
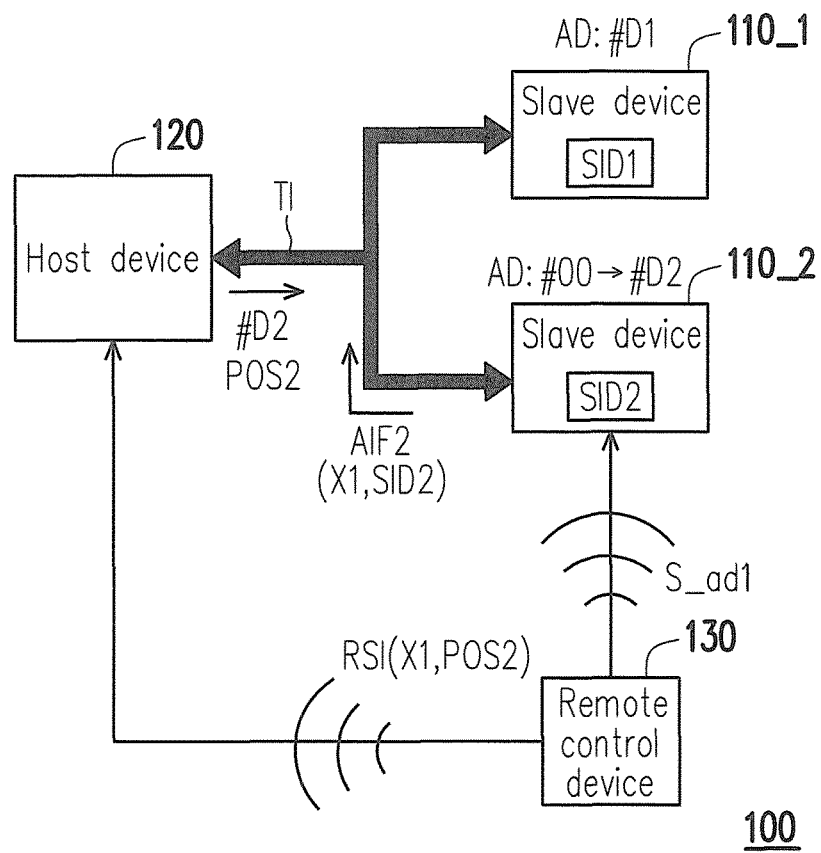
FIG. 5 is a schematic of a host-slave control system according to another embodiment of the invention performing an addressing action.

FIG. 5 is a schematic of a host-slave control system according to another embodiment of the invention performing an addressing action. In the present embodiment, after addressing of the slave device 110_1 is complete, an addressing action is successively performed on another slave device 110_2 as an example.

As shown in FIG. 5, after the addressing action of the slave device 110_1 is complete, engineering staff can then perform addressing on the slave device 110_2 using the remote control device 130. When the slave device 110_2 receives an addressing signal S_ad1 emitted by the remote control device 130, the slave device 110_2 sends an addressing information AIF2 to the host device 120. In particular, the addressing information AIF2 includes a device engineering code and a default identification code SID2 of the slave device 110_2. In the addressing information AIF2, the default identification code SID2 of the slave device 110_2 is different from the default identification code SID1 of the slave device 110_1. Moreover, since the slave device 110_2 similarly receives the addressing signal S_ad1 emitted by the remote control device 130, the device engineering codes sent by the slave devices 110_1 and 110_2 are similarly X1, and therefore the addressing information AIF2 is represented by AIF2 (X1, SID2).

Similarly to the embodiment of FIG. 4, the remote control device 130 returns the remote control setting information RSI to the host device 120 such that the host device 120 compares the device engineering code in the addressing information AIF2 with the remote control engineering code in the remote control setting information RSI, and accordingly decides whether to assign a specific address to the slave device 110_2. In the present embodiment, the host device 120 assigns the address "#D2" to the slave device 110_2 when determining both the remote control engineering code and the device engineering code are X1 (i.e., the remote control engineering code is matched with the device engineering code). In particular, the address "#D1" of the slave device 110_1 and the address "#D2" of the slave device 110_2 are different from each other.

The difference of the present embodiment and the embodiment of FIG. 4 is that, in addition to including the remote control engineering code X1, the remote control setting information RSI of the present embodiment can further include an absolute position information POS2 corresponding to the slave device 110_2. In particular, the absolute position information POS2 can be inputted by engineering staff using the control interface of the remote control device 130, or generated by using the positioning function (such as global positioning system (GPS)) of the remote control device 130, and the invention is not limited thereto. In addition, in other embodiments, the remote control device 130 can also send the remote control setting information RSI containing only the remote control engineering code X1, and the absolute position information POS2 can be inputted by engineering staff directly through the control interface of the host device 120.

Accordingly, when the host device 120 of the present embodiment is performing addressing on the slave device 110_2, the host device 120 can link the absolute position information POS2 to the address #D2 of the slave device 110_2 at the same time.

Figure 6:
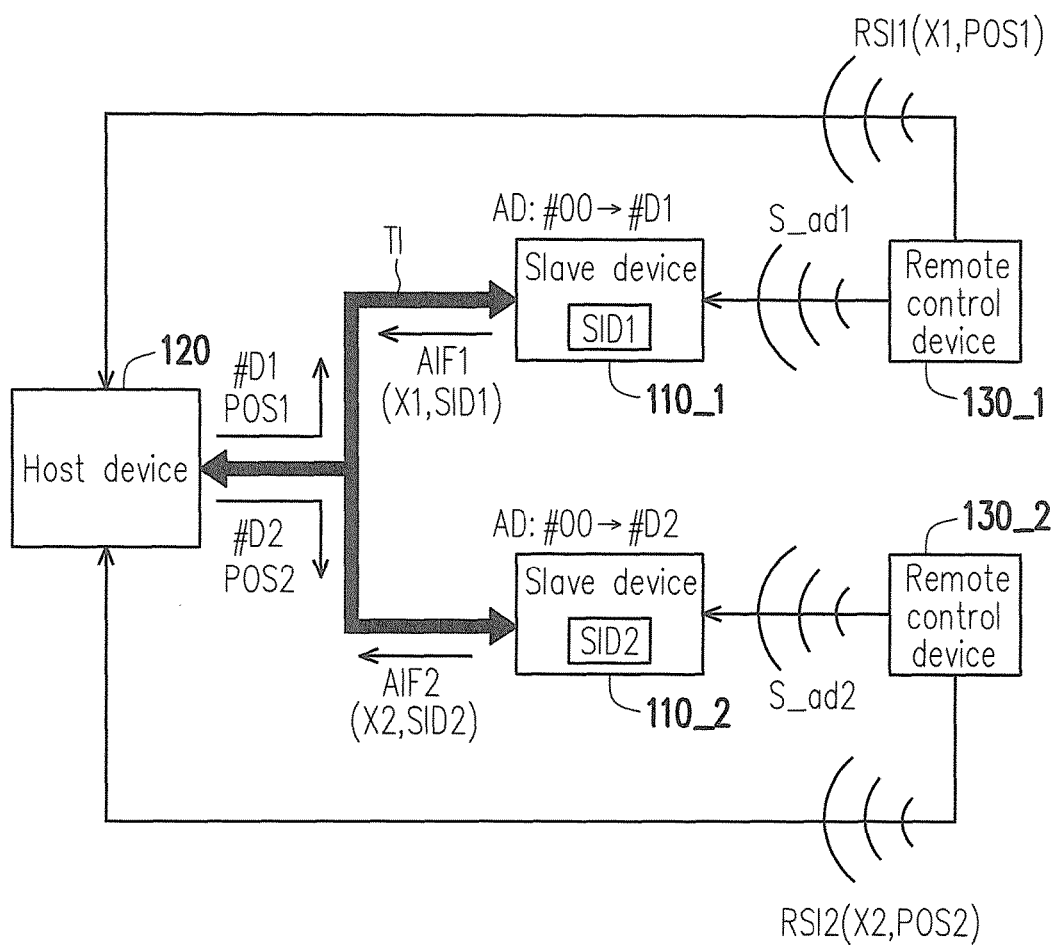
FIG. 6 is a schematic of a host-slave control system according to yet another embodiment of the invention performing an addressing action.

FIG. 6 is a schematic of a host-slave control system according to yet another embodiment of the invention performing an addressing action. In the present embodiment, a plurality of remote control devices 130_1 and 130_2 are used to respectively perform an addressing action on different slave devices 110_1 and 110_2 as an example.

As shown in FIG. 6, a plurality of engineering staff can perform addressing on the slave devices 110_1 and 110_2 respectively via the remote control devices 130_1 and 130_2. In particular, the individual processing steps of using the remote control device 130_1 to perform addressing on the slave device 110_1 and using the remote control device 130_2 to perform addressing on the slave device 110_2 are substantially the same as the embodiments of FIG. 4 and FIG. 5 and are not repeated herein. The difference of the present embodiment and the above embodiments is that, the two remote control devices 130_1 and 130_2 of the present embodiment respectively emit different addressing signals S_ad1 and S_ad2, such that the slave devices 110_1 and 110_2 respectively return different device engineering codes (such as X1 and X2). Moreover, the remote control devices 130_1 and 130_2 also respectively return different remote control engineering codes to the host device 120. Accordingly, the host device 120 can respectively assign corresponding addresses (such as "#D1" and "#D2") to the slave devices 110_1 and 110_2 through a method of comparing the remote control engineering code and the device engineering code.

Specifically, when engineering staff respectively perform addressing on the slave devices 110_1 and 110_2 via the remote control devices 130_1 and 130_2 at the same time, the information received by the host device 120 includes the addressing information AIF1 (containing the device engineering code X1 and the default identification code SID1) returned by the slave device 110_1, the addressing information AIF2 (containing the device engineering code X2 and the default identification code SID2) returned by the slave device 110_2, the remote control setting information RSI1 (containing the remote control engineering code X1 and the absolute position information POS1) returned by the remote control device 130_1, and the remote control setting information RSI2 (containing the remote control engineering code X2 and the absolute position information POS2) returned by the remote control device 130_2.

After the action of comparing the remote control engineering code and the device engineering code, the host device 120 determines the remote control engineering code of the remote control device 130_1 is matched with the device engineering code of the slave device 110_1 (both are X1), and the remote control engineering code of the remote control device 130_2 is matched with the device engineering code of the slave device 110_2 (both are X2). Therefore, the host device 120 respectively assigns the addresses "#D1" and "#D2" to the slave devices 110_1 and 110_2, and then respectively links the absolute position information POS1 and POS2 to the corresponding addresses "#D1" and "#D2." The addressing actions of the slave devices 110_1 and 110_2 are therefore completed at the same time.

In other words, different remote control devices 130_1 and 130_2 can be set to correspond to different engineering codes. For instance, the engineering code of the remote control device 130_1 is X1, and the engineering code of the remote control device 130_2 is X2. Therefore, a plurality of remote control devices 130 can be used to perform an addressing action on different slave devices 110_1 and 110_2, thus facilitating simultaneous setting and maintenance.

Figure 7:
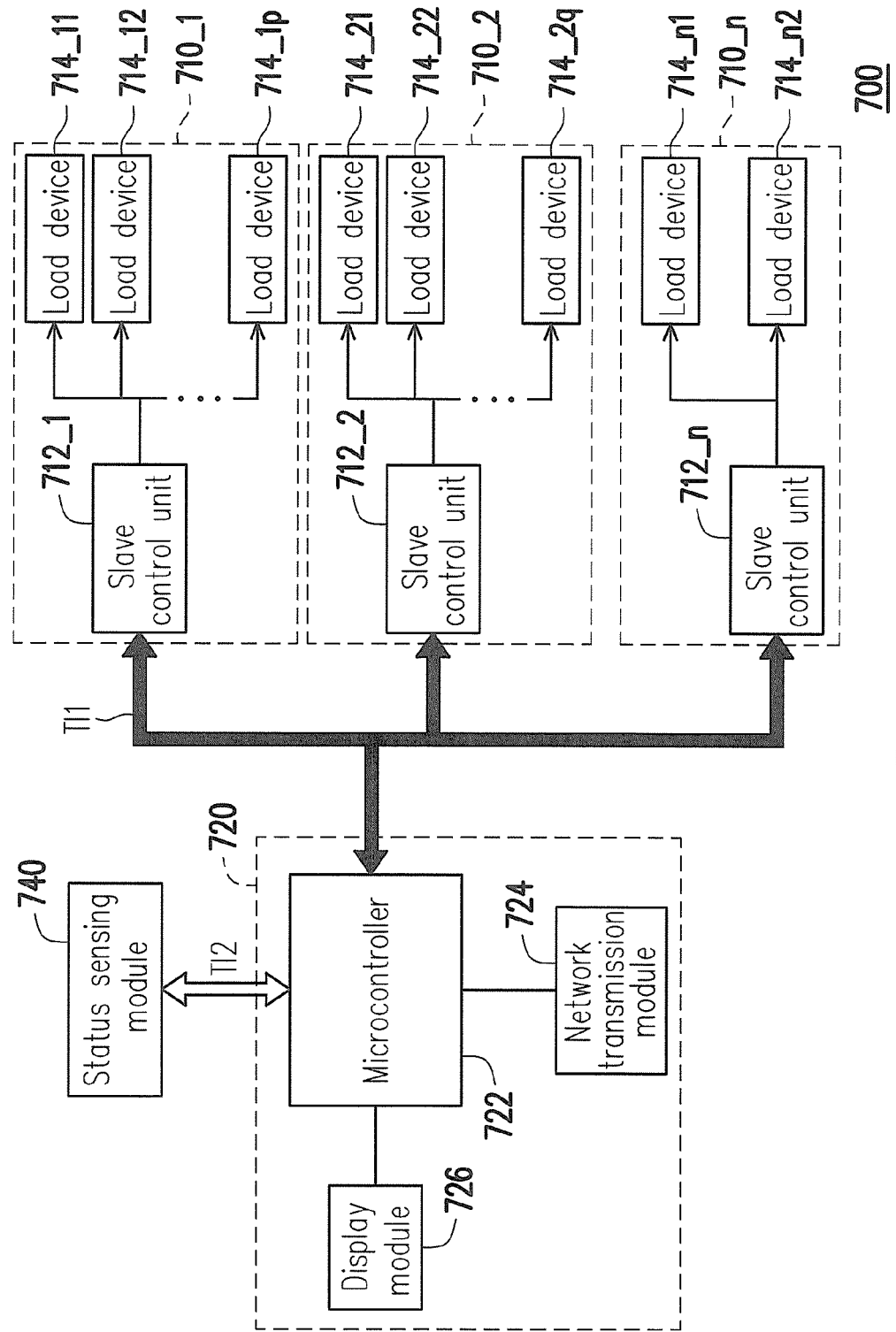
FIG. 7 is a system configuration schematic of a host-slave control system according to an embodiment of the invention.

FIG. 7 is a system configuration schematic of a host-slave control system according to an embodiment of the invention. Referring to FIG. 7, a host-slave control system 700 of the present embodiment includes slave devices 710_1 to 710_n, a host device 720, and a status sensing module 740.

In the present embodiment, each of the slave devices 710_1 to 710_n can further include one slave control unit and at least one load device. For instance, the slave device 710_1 includes a slave control unit 712_1 and load devices 714_11 to 714_1p, the slave device 710_2 includes a slave control unit 712_2 and load devices 714_21 to 714_2q, and the slave device 710_n includes a slave control unit 712_n and load devices 714_n1 and 714_n2, wherein p and q are positive integers. Accordingly, the slave control units 712_1 to 712_n can be, for instance, electrical ballasts, dimmers, power switches, and/or motor controlled switches for a lamp. The load devices 714_11 to 714_1p, 714_21 to 714_2q, 714_n1, and 714_n2 can be, for instance, equipment such as lamps, motors, and/or air conditioners.

The host device 720 can include, for instance, a microcontroller (MCU) 722 (or central processing unit (CPU)), a network transmission module 724, and a display module 726. In the host device 720, the microcontroller 722 is mainly used for achieving the functions of logic judgment and computing. The network transmission module 724 can be, for instance, a wired/wireless transmission module such as an Ethernet (ETH) module or a wireless network module capable of receiving a remote control setting information returned by a remote control device (not shown). The display module 726 can be, for instance, any type of display such as a flat panel display, a projection display, or a soft display capable of displaying the current operational status of each of the slave devices 710_1 to 710_n or other relevant information.

The status sensing module 740 is coupled to the host device 720, and can be used to sense environmental status information (such as ambient brightness, ambient temperature, or ambient humidity), and return the sensed environmental status information to the host device 720 via a transmission interface TI2. Accordingly, the host device 720 can correspondingly adjust the operational status of the slave devices 710_1 to 710_n according to the environmental status information sensed by the status sensing module 740. As a result, the function of smart regulation of the operation of the load devices according to changes in environmental status can be achieved.

In an exemplary embodiment, the load devices 714_11 to 714_1p and the load devices 714_21 to 714_2p can be, for instance, lamps installed in different rooms, and the load devices 714_n1 and 714_n2 can be, for instance, motors controlling the opening and closing of curtains respectively disposed in the rooms. Moreover, the status sensing module 740 can be, for instance, a light sensor installed in each room, wherein the host device 720 can correspondingly control the brightness of the lamps and the opening and closing of the curtains in different rooms according to the brightness information of each room sensed by the light sensor.

For instance, when the host device 720 determines the brightness of each room is less than a default value (i.e., possibly is a cloudy day) according to the brightness information, the host device 720 emits a corresponding control command to the slave control units 712_1 to 712_n. Thus, the slave control units 712_1 to 712_n adjust the operation of the load devices via a corresponding control behavior according to the received control command. As a result, the brightness of each room is increased. For instance, the lamps 714_11 to 714_1p connected to the slave control unit 712_1 are turned on; the brightness of the lamps 714_21 to 714_2q connected to the slave control unit 712_2 is increased from 50% of the maximum brightness to 90%; or, the motors 714_n1 and 714_n2 are turned on to increase the opening magnitude of the curtains, so as to increase the amount of light from the windows. However, the invention is not limited thereto.

In the present embodiment, the transmission interface TI2 can be achieved by, for instance, using a ZigBee communication protocol, but the invention is not limited thereto. The status sensing module 740 can be, for instance, one or a plurality of a temperature sensor, a light sensor, a humidity sensor, and a smoke sensor, but the invention is not limited thereto.

It should also be mentioned that, the various data sent by the status sensing module 740 to the host device 720 can also be uploaded to an external network or placed in a cloud server through the network transmission module 724. Alternatively, the obtained data is transmitted to a processing unit having greater back-end computing power through other wired transmission interfaces (not shown, such as USB, mini-USB, or PS2), so as to perform data analysis and various other applications (such as analysis of use habits). In an exemplary embodiment, the status sensing module 730 can further be integrated with, for instance, an access control device, an operating system, or a user interface. For instance, the status sensing module 730 sends a message that a user left a room as detected by an access control device to the host device 720, and then the host device 720 emits a shutdown command to the slave devices controlling equipment such as lighting or an air conditioner. However, the invention is not limited thereto.

Based on the above, the embodiments of the invention provide a host-slave control system and an addressing method thereof. The addressing method can be performed via a method of remote control, and therefore engineering staff can first finish installation of all the slave devices and then perform addressing and the setting of absolute position on each of the slave devices. As a result, the risk of negligence by engineering staff during construction can be reduced, and the efficiency of system building can be effectively increased. Moreover, the host-slave control system can collect environmental information via a status sensing module and provide the environmental information to the host device as reference for control. Therefore, the host-slave control system of the present embodiment can also achieve dynamic adjustment of, for instance, light brightness, air conditioning intensity, and the magnitude of the opening and closing of curtains according to change in environmental status. As a result, the design of smart buildings is achieved.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A host-slave control system, comprising:
   a plurality of slave devices, wherein each of the slave devices has a corresponding default identification code;
   a host device coupled to and controlling the slave devices through a host-slave transmission interface; and
   a first remote control device configured to emit a first addressing signal,
   wherein when one of the slave devices receives the first addressing signal, the one of the slave devices sends a first addressing information to the host device to order the host device to assign a first address as an address of the one of the slave devices according to the first addressing information,
   wherein the first addressing information comprises a first default identification code of the one of the slave devices, wherein the first address assigned to the one of the slave devices corresponds to the first default identification code,
   wherein the first remote control device further returns a remote control setting information to the host device, wherein the remote control setting information comprises a remote control engineering code and an absolute position information,
   wherein the first addressing information sent by the one of the slave devices in response to the first addressing signal further comprises a first device engineering code,
   wherein the host device assigns the absolute position information to correspond to the first address when the host device determines that the remote control engineering code is matched with the first device engineering code.

2. The host-slave control system of claim 1, wherein the host device assigns the first address as the address of the one of the slave devices when the host device receives the first addressing information and the remote control setting information within a same period.

3. The host-slave control system of claim 1, wherein the host device compares the first device engineering code with the remote control engineering code when the host device receives the first addressing information and the remote control setting information, and assigns the first address as the address of the one of the slave devices when the remote control engineering code is determined to be matched with the first device engineering code.

4. The host-slave control system of claim 1, wherein the absolute position information is inputted from the first remote control device, and is contained in the remote control setting information to be emitted to the host device.

5. The host-slave control system of claim 1, wherein the absolute position information is inputted from the host device.

6. The host-slave control system of claim 1, wherein when the host device receives the first addressing information, the host device controls the one of the slave devices to send a position indication message.

7. The host-slave control system of claim 1, further comprising:
a second remote control device configured to emit a second addressing signal,
wherein when another one of the slave devices receives the second addressing signal, the another one of the slave devices sends a second addressing information to the host device, to order the host device to assign a second address as an address of the another one of the slave devices according to the second addressing information,
wherein the second addressing information comprises a second default identification code of the another one of the slave devices, wherein the second address assigned to the another one of the slave devices corresponds to the second default identification code.

8. The host-slave control system of claim 7, wherein the first addressing signal comprises the first device engineering code and the second addressing signal comprises a second device engineering code, and the first and second device engineering codes are different from each other.

9. The host-slave control system of claim 1, further comprising:
a status sensing module coupled to the host device and configured to sense an environmental status information,
wherein the host device adjusts an operational status of at least one of the slave devices according to the environmental status information.

10. The host-slave control system of claim 1, wherein each of the slave devices comprises: at least one load device; and a slave control unit coupled to the load device and controlled by the host device to control an operation of the load device.

11. The host-slave control system of claim 1, wherein the host-slave transmission interface is a digital addressable lighting interface (DALI).

12. An addressing method of a host-slave control system, wherein the host-slave control system comprises a host device and a plurality of slave devices, the addressing method comprising:
sending an addressing information to the host device by one of the slave devices when the one of the slave devices receives an addressing signal, wherein the addressing information comprises a default identification code of the one of the slave devices; and
assigning a first address as an address of the one of the slave devices according to the addressing information when the host device receives the addressing information,
wherein the first address assigned to the one of the slave devices corresponds to the default identification code of the one of the slave devices,
wherein the first remote control device further returns a remote control setting information to the host device,
wherein the remote control setting information comprises a remote control engineering code and an absolute position information,
wherein the addressing information sent by the one of the slave devices in response to the addressing signal further comprises a first device engineering code,
wherein the host device assigns the absolute position information to correspond to the first address when the host device determines that the remote control engineering code is matched with the first device engineering code.

13. The method of claim 12, wherein the step of assigning the first address as the address corresponding to the one of the slave devices according to the addressing information comprises:
receiving the remote control setting information by the host device;
comparing the first device engineering code with the remote control engineering code by the host device;
determining whether the remote control engineering code is matched with the first device engineering code; and
assigning the first address as the address of the one of the slave devices by the host device when the remote control engineering code is determined to be matched with the first device engineering code.

14. The method of claim 12, further comprising:
controlling the one of the slave devices to send a position indication message when the host device receives the addressing information.

15. The method of claim 12, further comprising: sensing an environmental status information; and adjusting an operational status of at least one of the slave devices according to the environmental status information.

16. An addressing method of a host-slave control system, wherein the host-slave control system comprises a host device, a plurality of slave devices and a remote control device, the addressing method comprising:
emitting an addressing signal by the remote control device;
sending an addressing information to the host device by one of the slave devices when the one of the slave devices receives the addressing signal,
wherein the addressing information comprises a device engineering code and a default identification code of the one of the slave devices;
returning a remote control setting information to the host device by the remote control device,
wherein the remote control setting information comprises a remote control engineering code and an absolute position information;
comparing the device engineering code with the remote control engineering code by the host device; and
assigning a first address as an address of the one of the slave devices by the host device when the host device determines that the remote control engineering code is matched with the device engineering code,
wherein the first address assigned to the one of the slave devices corresponds to the default identification code of the one of the slave devices,
wherein the host device assigns the absolute position information to correspond to the first address when the host device determines that the remote control engineering code is matched with the device engineering code.

* * * * *